United States Patent [19]
Cradduck

[11] Patent Number: 4,759,740
[45] Date of Patent: Jul. 26, 1988

[54] DUAL ENGAGING SILENT CHAIN DRIVE

[75] Inventor: Kevin M. Cradduck, Groton, N.Y.

[73] Assignee: Borg-Warner Automotive, Inc., Troy, Mich.

[21] Appl. No.: 32,815

[22] Filed: Apr. 1, 1987

[51] Int. Cl.[4] .......................................... F16G 13/04
[52] U.S. Cl. ..................................... 474/212; 474/213
[58] Field of Search ............................. 474/212–217, 474/155–157; 59/84, 89

[56] References Cited

U.S. PATENT DOCUMENTS

| Re. 12,912 | 1/1909 | Morse | 474/212 X |
|---|---|---|---|
| 1,115,960 | 11/1914 | Morse | 474/217 |
| 1,270,460 | 6/1918 | Taylor | 474/213 X |
| 1,447,644 | 3/1923 | Chapman | 474/157 |
| 1,560,647 | 11/1925 | Belcher | 474/214 X |
| 1,598,906 | 9/1926 | Dull | 474/214 |
| 1,634,641 | 7/1927 | Bens | 474/217 |
| 1,878,882 | 9/1932 | Morse | 474/213 X |
| 2,056,602 | 10/1936 | Dull et al. | 474/213 X |
| 2,525,561 | 10/1950 | Pierce | 474/213 |
| 2,653,485 | 9/1953 | MacArthur | 474/215 |
| 3,495,468 | 2/1970 | Griffel | 474/157 |
| 4,168,634 | 9/1979 | Griffel | 474/157 X |

FOREIGN PATENT DOCUMENTS

| 2751320 | 5/1978 | Fed. Rep. of Germany | 474/215 |
|---|---|---|---|
| 2821039 | 12/1978 | Fed. Rep. of Germany | 474/215 |
| 411774 | 6/1934 | United Kingdom | 474/214 |

Primary Examiner—Stephen J. Novosad
Assistant Examiner—Thuy M. Bui
Attorney, Agent, or Firm—James A. Geppert

[57] ABSTRACT

A silent chain for automotive vehicle or industrial drive applications wherein the chain is formed of blocks of links alternating with pairs of guide links joined by pivot pins wherein both teeth of each link are in driving engagement with the teeth of the driving sprocket with alternating inside flank and outside flank engagement. The pins joining the guide links and blocks of links lie on the approximate pitch diameter of the sprocket. Each link has the inside flank defined by a compound curve with one radius centered in an aperture center for the link.

12 Claims, 3 Drawing Sheets

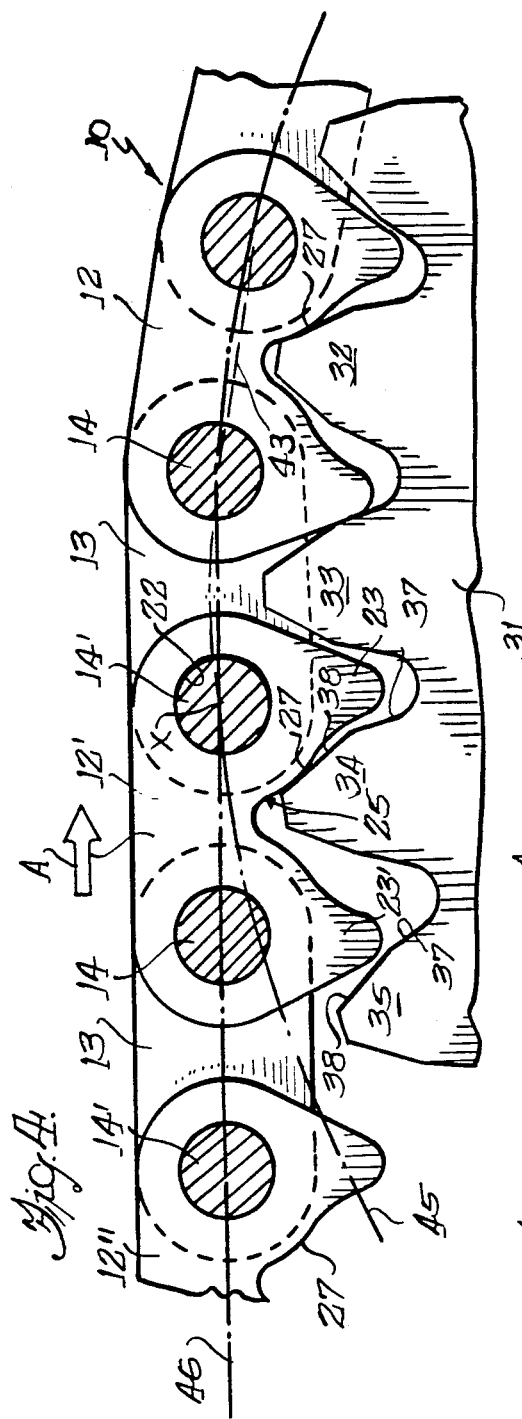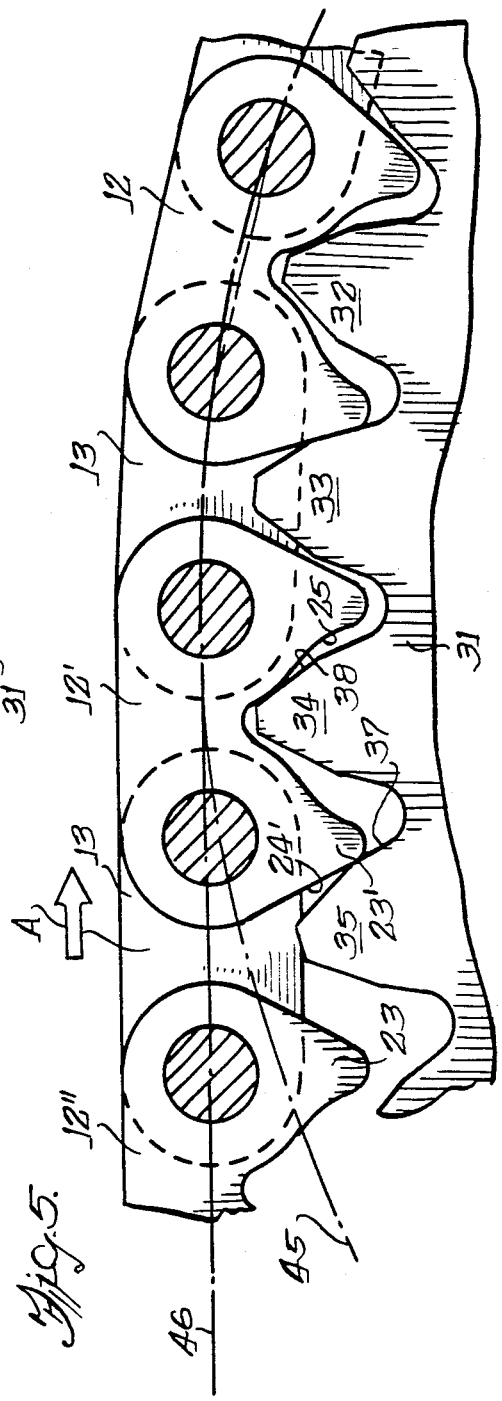

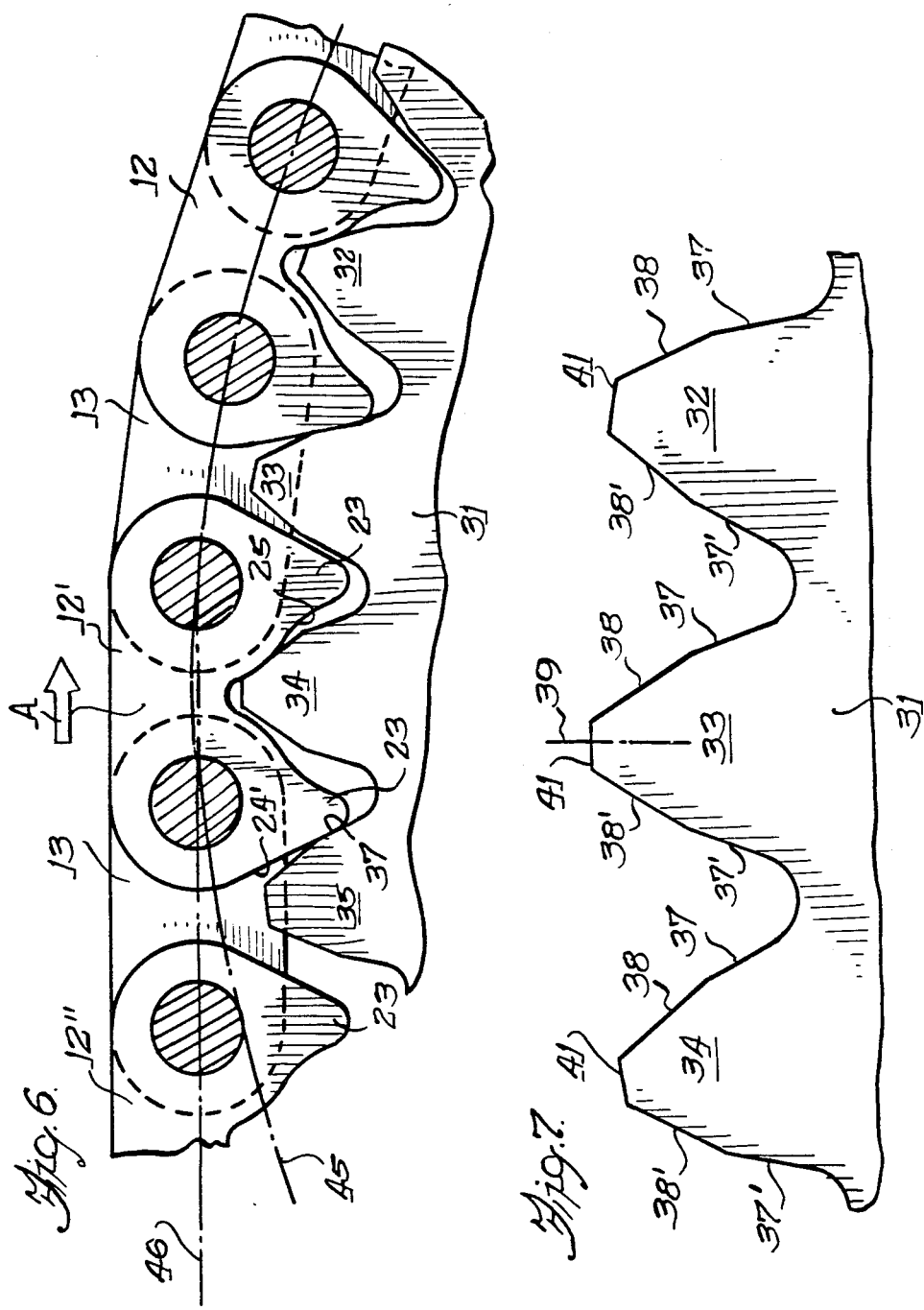

DUAL ENGAGING SILENT CHAIN DRIVE

BACKGROUND OF THE INVENTION

The present invention relates to an improved silent timing chain for automotive or industrial drive applications.

Conventional silent timing chains have been used for many years to transmit power and motion between shafts in automotive applications. The majority of these chains were formed of rows or ranks of toothed links interleaved with adjacent rows of toothed links and having aligned apertures receiving pivot means to join the rows and provide articulation of the chain as it passes around the driving and driven sprockets. Guide links were utilized on the outside edges of alternate rows of links in the chain to position the chain laterally on the sprockets. Each row of links engaged the sprocket teeth on either their inner flank or their outer flank, and each joint was supported by the links in one row. Each tooth on the driving sprocket transferred load to the chain, which offered a smooth engagement with the sprocket and quiet operation.

Silent chains were also produced using block constructions in the early 1900's. However, their usefulness was limited due to their low strength and they were replaced by the silent chains previously described. The engagement characteristics of these early block chains are unknown, but it is likely that such chains were constructed by omitting the inside links in the guide row without compensating for the lack of interleaved links present in conventional silent chains, such that contact was sporadic with every other tooth. Other types of timing drive chains involve the use of roller chains, especially in industrial applications.

Also, double angle, straight-sided sprocket tooth flanks have been used in the past, however, it is believed that the only purpose for the chamfer at the tip of the tooth was for link clearance during engagement and disengagement processes.

SUMMARY OF THE INVENTION

The present invention relates to an improved dual engaging silent timing chain drive designed to transmit torque and power between shafts as well as serve as a mechanical motion transfer mechanism. The chain is constructed in a block configuration comprising groups or blocks of closely stacked inside links designed to drivingly contact the driving and driven sprockets alternating with and flanked by pairs of outside guide links or a center guide link in the adjacent rows. The interleaved inside links normally found in the rows having guide links have been omitted, resulting in a chain design constructed of fewer components which is lighter in weight and lower in manufacturing cost.

The present invention also comprehends the provision of a novel dual engaging silent timing chain drive wherein the inside links are so constructed and arranged to optimize the engagement characteristics of the chain. By nature of this design, the chain yields a combination of rolling and sliding action that occurs throughout the engagement process, minimizing both noise and wear. The link design provides smooth engagement of both the inside and outside flanks, enabling it to be used in block-type lacing patterns. Also, a novel sprocket tooth profile is designed to mate with the link plates. Thus, all of the teeth on the sprocket act to transfer load to the chain and each joint of the chain is supported as it engages the driving sprocket, resulting in quiet operation similar to conventional silent chain formed of interleaved rows of links.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIGS. 4, 5 and 6 are side elevational views in sequence of the chain links engaging the sprocket teeth.

FIG. 7 is a partial side elevational view of the sprocket utilized with the chain of the present invention.

DESCRIPTION OF THE PREFERRED EMBODIMENT

Figure 1:
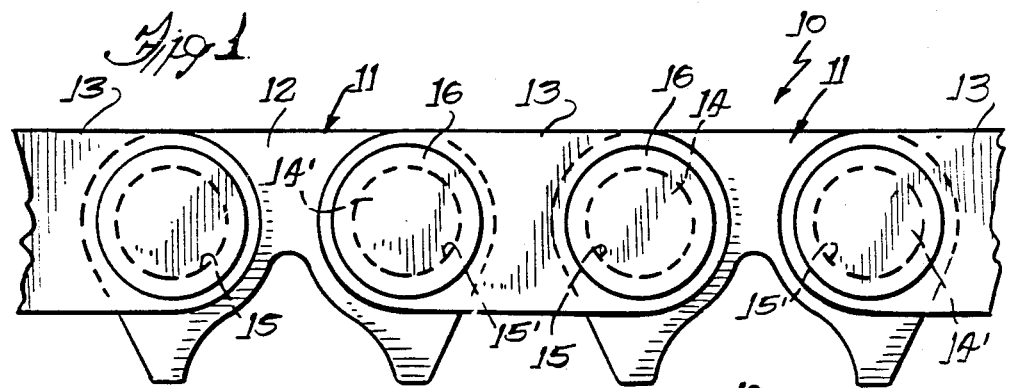
FIG. 1 is a side elevational view of a portion of the silent timing drive chain of the present invention.
Figure 2:
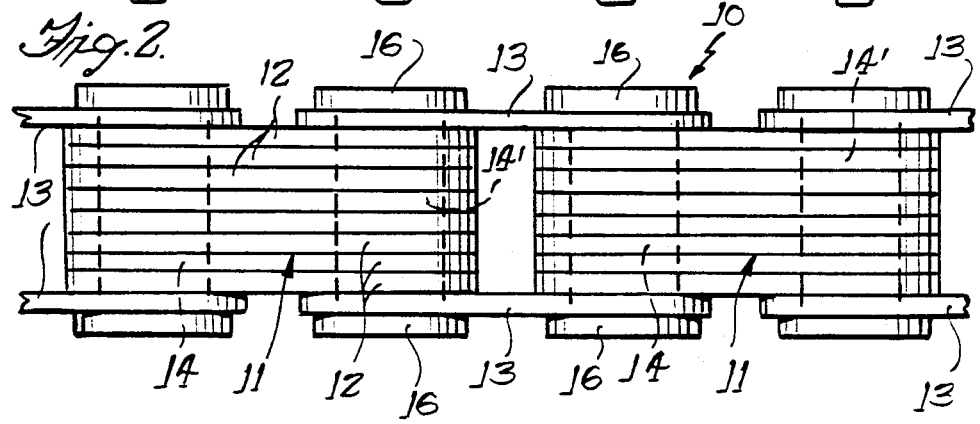
FIG. 2 is a top plan view of the chain portion of FIG. 1.

Referring more particularly to the disclosure in the drawings wherein is shown an illustrative preferred embodiment of the present invention, FIGS. 1 and 2 disclose a silent timing drive chain 10 utilized to drive the cam shaft in an automotive vehicle engine, wherein the chain consists of blocks 11 of inside links 12 (FIG. 3) alternating with pairs of flanking guide links 13 joined by round pivot pins 14,14' or other suitable pivot means. Each guide link 13, as seen in FIG. 1, does not have a toothed configuration as it is utilized only to prevent lateral motion of the chain relative to the sprocket (see FIGS. 4, 5 and 6), but is provided with spaced apertures 15,15' receiving the pivot pins 14,14'; which pins either have a press fit within the apertures 15,15' or project through the apertures to be headed at 16 at each end retaining the links together.

Figure 3:
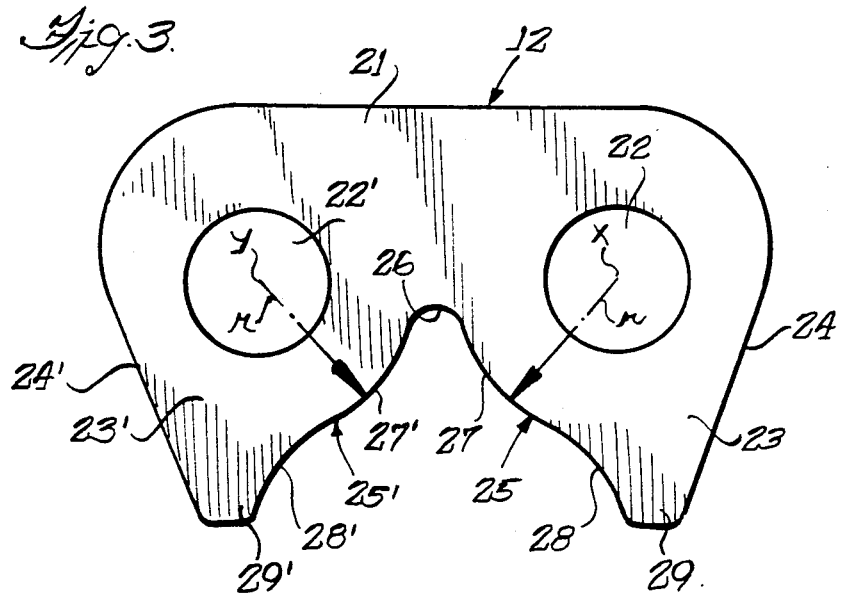
FIG. 3 is a side elevational view of the novel link configuration of the chain.

Each inside link 12 in a block, as seen in FIG. 3, consists of an inverted toothed link including a link body 21 having a pair of spaced apertures 22 and 22' to receive the pivot pins 14,14', and a pair of teeth 23 and 23' depending from the link body; each tooth having a generally straight outside flank 24 or 24' and an inside flank 25 or 25' having a compound curve, the flanks 25,25' meeting in a rounded crotch 26 located below a line through the centers of the apertures 22,22'.

The inside flanks 25 and 25' are each formed of a compound curve having a surface 27 or 27' generated by radius r from the centers X and Y of apertures 22 and 22' extending from the crotch 26 to and merging into a reverse curved surface 28 or 28' which extends to the toes 29 or 29' forming the lower ends of the teeth 23 and 23'. Although shown as generally straight outside flanks 24,24', these surfaces may be curved generated by radii with their centers located either at aperture centers X and Y or outside the link confines.

FIG. 7 discloses a portion of the driving sprocket 31 cooperating with the block-type chain 10 of FIGS. 1 through 6. The sprocket consists of a circular body with a plurality of equally spaced teeth 32, 33, 34, 35, etc., each tooth having a pair of outwardly converging lower sides or flanks 37,37' and upper sides or flanks 38,38' of a greater angle of convergence to a center line 39 of the tooth; each tooth terminating in a generally flattened outer end 41.

Now considering FIGS. 4 through 6, the driving sprocket 31 with the plurality of identical equally spaced teeth 32, 33, 34, 35 is shown in progressive driving engagement with the block-type chain 10. In FIG. 4, the chain 10 moves to the right in the direction of arrow A into engagement with the sprocket 31 on the horizontal line 46 or chain pitch line. There will be two pins 14,14' flanking a sprocket tooth 33 at "top dead center"; at which point the pitch line 46 of the chain will be tangent to the chordal pitch diameter of the sprocket; i.e. the circle smaller than circle 45 that is tangent to the chords 43 formed when the chain wraps the sprocket. As the sprocket rotates clockwise, the pin 14 of the right hand side of the sprocket tooth 33 will follow the arc 45 of the sprocket pitch diameter; i.e. the circle passing through the center of the chain pins 14,14' as the chain is wrapped on the sprocket 31. Thus, the pin 14' will rise vertically reaching a maximum value when this pin is "top dead center" and is flanked by two teeth. As the sprocket continues to rotate clockwise, this pin will follow the arc 45 of the sprocket pitch diameter until another tooth is at "top dead center". The pin will now be at the left hand position of the sprocket tooth and the horizontal pitch line 46 passing through the centers of the pins in the free strand will again be tangent to the chordal pitch diameter.

Considering the engagement of the links 12 with the sprocket 31, link 12 is in substantially full engagement with adjacent sprocket teeth 32 and 33 as the sprocket rotates in the direction of arrow A. The next successive tooth 34 has its upper flank or edge 38 initially engaging the lower end of curve 27 on the inside flank 25 of link tooth 23 for chain link 12' at the instant that point X reaches the pitch line 45 of the sprocket 31 while the other tooth 23' is spaced from the sprocket tooth 35. From this instant to the time of full engagement, the link 12' will continue to pivot about point X. Furthermore, the path of point X, the center of the leading aperture 22, will continue to follow the sprocket pitch line 45.

As rotation of the sprocket continues (see FIG. 5), the upper flank 38 of sprocket tooth 34 will continue to engage inner link flank 25 with the flank 25 rolling along the sprocket tooth. At some instant between initial and full engagement, the outside flank 24' of tooth 23' moves into contact with the lower flank 37 of sprocket tooth 35.

Further rotation of the sprocket 31 in the direction of arrow A causes the inside flank 25 of tooth 23 to roll farther up the flank 38 of tooth 34 where the sprocket tooth and link tooth are in full engagement (FIG. 6). Also, the outside flank 24' of the trailing tooth 23' slides on and more fully engages the flank 37 of sprocket tooth 35, and the leading tooth 23 of the next link 12" approaches engagement with the next succeeding sprocket tooth. As the chain is wrapped around the sprocket, the teeth remain in full engagement until the links 12 begin to leave the sprocket and travel towards the driven sprocket (not shown). The driven sprocket is driven by the chain as it leaves the sprocket and enters the tight strand leading to the driving sprocket in the direction of arrow A. On the other side of the driven sprocket, the sprocket acts as a driver in relation to the slack strand of the chain.

Also as seen in FIGS. 4, 5 and 6, when the links are in full engagement with the sprocket teeth, contact is maintained on the sprocket when the chain is under tension and each sprocket tooth carries load for strength of the sprocket. The construction of the chain is more economical and results in a quiet operation of the chain. Noise tests have shown that the present improved chain is less noisy than an equivalent roller chain.

I claim:

1. A chain link for use in a silent timing chain cooperating with a driving sprocket having circumferentially equally spaced teeth thereon, the chain including rows of identical inverted tooth links stacked adjacent to each other forming blocks alternating with and separated by pairs of flanking guide links, said inverted tooth links engaging the sprocket teeth, each link including a link body having a pair of spaced apertures to receive pivot means for articulation of the chain, each aperture having a center, said chain having a pitch line extending through said aperture centers, and a pair of spaced depending teeth having outside flanks and inside flanks joined by a rounded crotch, the inside flanks of the teeth having curved edges defined by radii centered in the aperture centers and a reverse curvature extending from the curved inside flank to and merging into a depending toe.

2. A chain link as set forth in claim 1, in which the curved inside flank of each tooth merges at one end into said rounded crotch and at the opposite end into said reverse curve.

3. A chain link as set forth in claim 2, wherein said outside flanks have substantially straight edges.

4. A chain link as set forth in claim 2, wherein the outside flank and the reverse curvature of the inside flank merge into a depending toe.

5. A chain link as set forth in claim 1, wherein the rounded crotch is located below the chain pitch line for the link.

6. A chain link as set forth in claim 1, wherein said sprocket teeth on said sprocket have double angle, straight sided flanks terminating in a generally flat outer end.

7. A chain link as set forth in claim 1, in which said chain links and flanking guide links have spaced apertures receiving said pivot means, said chain links having leading and trailing teeth engaging successive teeth on the sprocket.

8. A chain link as set forth in claim 7, wherein the curved inside flank of the leading tooth engages a sprocket tooth in a generally rolling engagement.

9. A chain link as set forth in claim 8, wherein the outside flank of the trailing tooth of a link engages a sprocket tooth in a sliding engagement.

10. A chain link as set forth in claim 9, in which the inside flank of the leading tooth of a link contacts a sprocket tooth at a point in time when the center of the leading aperture of the link reaches the pitch line of the sprocket.

11. A chain link as set forth in claim 9, wherein the sprocket teeth have double angle, straight sided flanks with the outer flank portion of a sprocket tooth engaging the curved inside flank of the leading link tooth.

12. A chain link as set forth in claim 11, wherein the sprocket tooth engaging the outside flank of the trailing tooth of a chain link engages with the sprocket tooth inner flank portion.

* * * * *